(12) United States Patent
Grabs et al.

(10) Patent No.: US 12,093,149 B2
(45) Date of Patent: Sep. 17, 2024

(54) CONTROL SYSTEM FOR A MOTOR VEHICLE, MOTOR VEHICLE, METHOD FOR CONTROLLING A MOTOR VEHICLE, COMPUTER PROGRAM PRODUCT, AND COMPUTER-READABLE MEDIUM

(71) Applicant: HELLA GmbH & Co. KGaA, Lippstadt (DE)

(72) Inventors: Peter Grabs, Wuerzburg (DE);
Frederic Holzmann, Wuerzburg (DE);
Ulrich Koehler, Lippstadt (DE);
Matthias Korte, Wuerzburg (DE);
Carsten Kuegeler, Lippstadt (DE);
Sergey Orlov, Paderborn (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 732 days.

(21) Appl. No.: 16/511,823

(22) Filed: Jul. 15, 2019

(65) Prior Publication Data
US 2019/0340090 A1 Nov. 7, 2019

Related U.S. Application Data

(63) Continuation of application No. PCT/EP2018/050339, filed on Jan. 8, 2018.

(30) Foreign Application Priority Data

Jan. 13, 2017 (DE) ............ 10 2017 100 618.4

(51) Int. Cl.
*G06F 11/20* (2006.01)
*G05D 1/00* (2024.01)

(52) U.S. Cl.
CPC ....... *G06F 11/2023* (2013.01); *G05D 1/0077* (2013.01); *G06F 11/2028* (2013.01); *G06F 11/2033* (2013.01)

(58) Field of Classification Search
CPC ............ G06F 11/2023; G06F 11/2038; G06F 11/2033; G06F 11/2028; G05D 1/0077;
(Continued)

(56) References Cited

U.S. PATENT DOCUMENTS 5,957,985 A   9/1999  Wong et al.
7,627,781 B2* 12/2009  Michaelis ........... G06F 11/2025
                                                   714/13
(Continued)

FOREIGN PATENT DOCUMENTS

DE   102006062300 A1   10/2008
DE   102013217601 A1    3/2015
(Continued)

OTHER PUBLICATIONS

International Search Report dated Mar. 26, 2018 in corresponding application PCT/EP2018/050339.
(Continued)

*Primary Examiner* — Matthew M Kim
*Assistant Examiner* — Matthew N Putaraksa
(74) *Attorney, Agent, or Firm* — Muncy, Geissler, Olds & Lowe, P.C.

(57) ABSTRACT

A control system for a motor vehicle having a first control unit for controlling a first function of the motor vehicle, a second control unit for controlling a second function of the motor vehicle and a backup control unit. At least the first or the second control unit is connected in a signal-transmitting manner with the backup control unit. In order to ensure the proper execution of functions of a motor vehicle controlled by the control units with the least possible additional overhead, even with a faulty control unit, the backup control unit is configurable in response to the input of an error signal from the first or the second control unit such that the
(Continued)

function of the motor vehicle corresponding to the faulty control unit is be controlled via the backup control unit.

14 Claims, 1 Drawing Sheet

(58) Field of Classification Search
CPC .. G05D 2201/0213; B60W 2050/0006; B60W 50/023; B60W 50/0205
See application file for complete search history.

(56) References Cited

U.S. PATENT DOCUMENTS

| | | | | |
|---|---|---|---|---|
| 9,195,232 | B1* | 11/2015 | Egnor | G05D 1/0055 |
| 10,099,753 | B2* | 10/2018 | Rearick | B63B 32/77 |
| 10,773,698 | B2* | 9/2020 | Ayichew | B60T 13/662 |
| 10,824,517 | B2* | 11/2020 | Sachidanandam | ............ G06F 11/1448 |
| 11,070,052 | B2* | 7/2021 | Qi | H02H 1/0061 |
| 11,214,270 | B2* | 1/2022 | Omari | G05D 1/0212 |
| 11,305,747 | B1* | 4/2022 | Lee | B60T 13/662 |
| 11,436,003 | B2* | 9/2022 | Mikhailov | H04L 67/12 |
| 2002/0196805 | A1* | 12/2002 | Brocco | G06F 11/2025 370/461 |
| 2004/0243287 | A1* | 12/2004 | Yanaka | B60W 50/02 701/33.6 |
| 2008/0010595 | A1* | 1/2008 | Chen | G06F 11/2025 715/718 |
| 2013/0246660 | A1* | 9/2013 | Gonen | G06F 11/0727 710/5 |
| 2014/0078889 | A1* | 3/2014 | Diab | H04L 67/63 370/221 |
| 2016/0059826 | A1* | 3/2016 | Krishnan | B60R 25/24 340/5.6 |
| 2016/0321148 | A1* | 11/2016 | Lassini | G06F 11/2033 |
| 2018/0060196 | A1* | 3/2018 | Samii | G06F 11/3433 |
| 2018/0101842 | A1* | 4/2018 | Ventura | H04L 9/0841 |
| 2018/0348754 | A1* | 12/2018 | Samii | G05B 23/0286 |
| 2019/0100105 | A1* | 4/2019 | Liu | B60L 15/20 |
| 2019/0268237 | A1* | 8/2019 | Kulkarni | H04L 41/122 |
| 2020/0156805 | A1* | 5/2020 | Andrus | B64D 31/04 |
| 2020/0247518 | A1* | 8/2020 | Dannenberg | G05D 1/0206 |
| 2020/0254875 | A1* | 8/2020 | Strandberg | G06F 3/0484 |
| 2022/0185299 | A1* | 6/2022 | Ye | B60W 30/0956 |
| 2023/0161583 | A1* | 5/2023 | Fang | B60R 16/023 701/36 |

FOREIGN PATENT DOCUMENTS

FR 2843341 A1 2/2004
WO WO9826958 A1 9/1999

OTHER PUBLICATIONS

Poledna S Ed, "Fault tolerance in safety critical automotive applications: Cost of agreement as a limiting factor"—Institute of Electrical and Electronics Engineers., vol. Symp. 25, Jun. 27, 1995, pp. 73-82, ISBN 978-0-7803-2965-2.

* cited by examiner

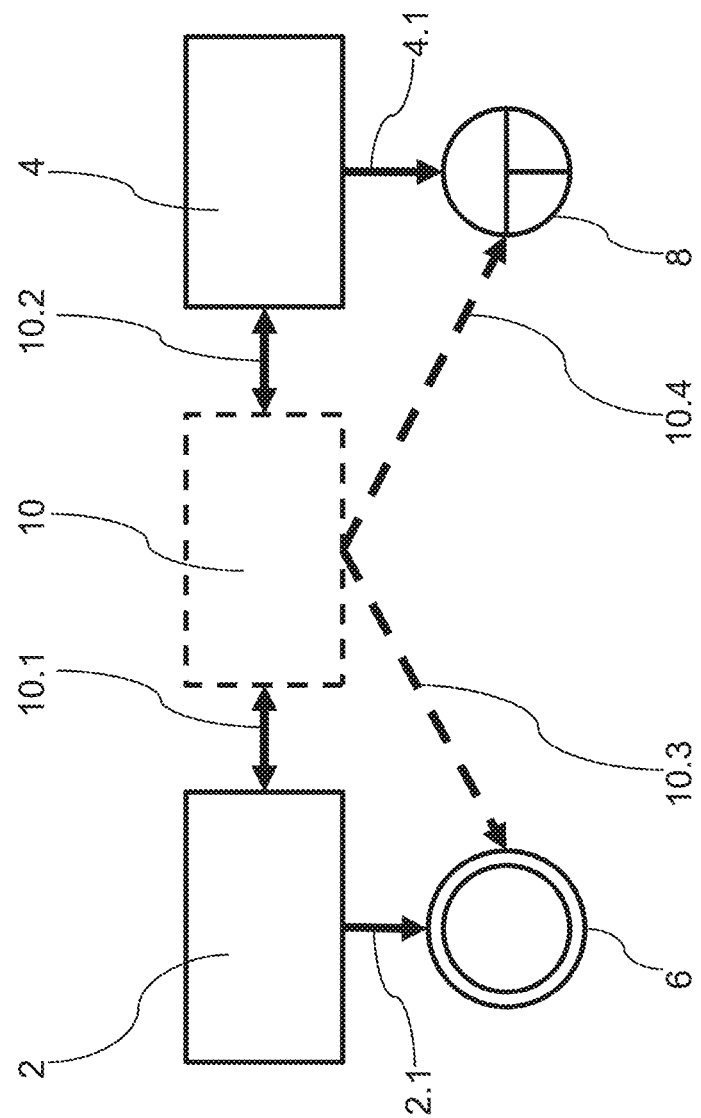

CONTROL SYSTEM FOR A MOTOR VEHICLE, MOTOR VEHICLE, METHOD FOR CONTROLLING A MOTOR VEHICLE, COMPUTER PROGRAM PRODUCT, AND COMPUTER-READABLE MEDIUM

This nonprovisional application is a continuation of International Application No. PCT/EP2018/050339, which was filed on Jan. 8, 2018, and which claims priority to German Patent Application No. 10 2017100 618.4, which was filed in Germany on Jan. 13, 2017, and which are both herein incorporated by reference.

BACKGROUND OF THE INVENTION

Field of the Invention

The present invention relates to a control system for a motor vehicle, a motor vehicle, a method for controlling a motor vehicle, a computer program product and a computer-readable medium.

Description of the Background Art

Control systems for motor vehicles, motor vehicles, methods for controlling motor vehicles, computer program products and computer-readable media are already known from numerous embodiments in the state of the art.

For example, from the machine translation of FR 2 843 341 B1 to English, a control system for a motor vehicle is known, comprising a first control unit designed as a brake control unit for controlling a first function of the motor vehicle embodied as a brake function, a second control unit designed as a steering control unit for controlling a second function of the motor vehicle embodied as a steering function, and a backup control unit designed as a central control unit, wherein the brake control unit and the steering control unit are each connected in a signal-transmitting manner with at least one sensor and/or at least one actuator, and wherein the brake control unit is connected in a signal-transmitting manner to the central control unit. In case the brake control unit fails, the central control unit initiates and controls an emergency brake.

SUMMARY OF THE INVENTION

It is therefore an object of the present invention to ensure that a proper execution of a function of a motor vehicle is controlled by control units even in the event of a faulty control unit, with the lowest possible overhead.

A significant advantage of the invention is, in particular, that functions of a motor vehicle different from another and controlled by control units can be continued to be safely executed in the event of failure of one of the control units with the lowest possible overhead. In this case, at least two functions of a motor vehicle that are different from another, and each controlled by a control unit, are continued to be executed in the event of failure of one of the two control units, without the need for each control unit to be provided a backup control unit. Accordingly, it is possible to save space and weight as well as to reduce costs. Especially in modern motor vehicles with a high degree of electrically and electronically designed functionality, i.e., a variety of functions controlled by control units, this is very important.

The wording according to which at least the first or the second control unit is connected in a signal-transmitting manner with the backup control unit as well as the wording in which the backup control unit is connected in a signal-transmitting manner with the first and the second control unit, should be interpreted in a broad sense. Instead of solely direct signal transmission connections, indirect signal transmission connections are also conceivable.

For example, an indirect signal transmission connection would be understood to be when in the respective error case, the first and/or the second control unit forwards an error message by means of a signal transmission connection to a higher-level control unit and the higher-level control unit then generates a corresponding output signal and transmits this to the backup control unit. Thus, the output signal of the higher-level control unit leads to a configuration of the backup control unit in such a way that by means of the backup control unit, the function of a motor vehicle corresponding to the faulty control unit is controllable. The same applies for the inventive method, according to which the backup control unit controls the function of a motor vehicle corresponding to the faulty control unit in response to the output signal of the higher-level control unit. The higher-level control unit can be, for example, a central control unit.

Basically, it is also conceivable according to the invention that a single backup control unit is also used for more than two control units controlling mutually different functions of the motor vehicle. In this way, the above-mentioned advantages are further enhanced. According to the invention, the term "control unit" is to be understood in a broad sense and refers to any type of electric or electronic device for the automatic control of a function of a motor vehicle.

It is possible that the backup control unit is reserved only for the event of failure of the first or second control unit. An especially advantageous development of the inventive control unit, however, provides that the backup control unit is simultaneously formed as a third control unit for controlling a third function of a motor vehicle, and in response to the input of the error signal, in addition to or instead of the third function of the motor vehicle, the first or second function of the motor vehicle corresponding to the faulty first or second control unit is controllable by means of the backup control unit. As a result, the required installation space and the weight as well as the associated manufacturing costs of the motor vehicle are reduced.

The same applies for the further development of the inventive method, according to which the backup control unit is simultaneously formed as a third control unit for controlling a third function of the motor vehicle, and in response to the input of the error signal, in addition to the or instead of the third function of the motor vehicle, controls the first or second function of the motor vehicle corresponding to the faulty first or second control unit.

In principle, the first function of the motor vehicle controlled by a first control unit and the second control unit controlled by a second control unit are freely selectable within wide suitable limits. A particularly advantageous development provides, however, that the first function of the motor vehicle is embodied as a brake function of the motor vehicle and the second function of the motor vehicle is embodied as a steering function of the motor vehicle. These are central and safety-relevant functions of the motor vehicle, which proper execution are of vital importance, especially in autonomous motor vehicles.

Autonomous motor vehicles are motor vehicles in which the driver, if at all, only performs a certain monitoring function. Autonomous motor vehicles are thus designed and configured to participate in traffic essentially independent of vehicle driver intervention. The vehicle driver is more a passenger than a decision maker regarding the functions of the motor vehicle.

However, the term "autonomous" should be interpreted broadly, so that different degrees of autonomous driving and autonomous motor vehicles are included. As an example, there is situational autonomous driving and therefore situational self-driving motor vehicles, in which depending on the traffic situation and/or the driving maneuvers that need to be carried out, autonomous driving occurs or not. Accordingly, reference can alternatively be made to automated driving and automated motor vehicles.

The same applies for the advantageous development of the inventive method, according to which the first function of the motor vehicle is embodied as a brake function of the motor vehicle and the second function of the motor vehicle is embodied as a steering function of the motor vehicle.

A further advantageous development of the inventive control system provides that the control system has a user interface and can be brought from a deactivation state into an activation state in response to the presence of an activation signal at the user interface, wherein in the deactivation state of the control system, the backup control unit does not control the function of the motor vehicle corresponding to the faulty control unit irrespective of the input of an error signal, and in the activation state of the control system, said backup unit controls the function of the motor vehicle corresponding to the faulty control unit in response to the input of the error signal. In this way, it is possible to equip motor vehicles with the inventive control system even before, for example, autonomous motor vehicles and associated functionalities are legally permissible. In a future change in laws, a switch to autonomous driving of a motor vehicle and thus to an inventive control system in its activation state is then possible with minimal overhead.

This is advantageous when there are divergent laws in different states, for example, with regard to the permissibility of autonomous motor vehicles. According to the above development, it is possible to develop, manufacture and distribute a uniform motor vehicle with respect to the components relevant to the invention despite divergent legal provisions in individual states.

The same applies for the development of the inventive method for controlling a motor vehicle, according to which the control system has a user interface and in response to the presence of an activation signal at the user interface, is brought from a deactivation state into an activation state, wherein in the deactivation state of the control system, the backup control unit does not control the function of the motor vehicle corresponding to the faulty control unit irrespective of the input of the error signal, and in the activation state of the control system, said backup unit controls the function of the motor vehicle corresponding to the faulty control unit in response to the input of the error signal.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawings which are given by way of illustration only, and thus, are not limitive of the present invention, and wherein the sole FIGURE illustrates an exemplary embodiment of an inventive control system for a motor vehicle.

DETAILED DESCRIPTION

The FIGURE shows by way of example an inventive control system for a motor vehicle. The control system has a first control unit 2 for a first function and a second control unit 4 for a second function of a motor vehicle, not further illustrated. The motor vehicle is designed as an autonomous motor vehicle in which the functions of the motor vehicle are selected and executed essentially automatically by the motor vehicle.

The first function is embodied as a brake function and the second function is embodied as a steering function of the motor vehicle. Correspondingly, the first control unit 2 controls the brake function of the motor vehicle and the second control unit 4 controls the steering function of the motor vehicle. The first control unit 2 for controlling the brake function of the motor vehicle is connected in a signal-transmitting manner with first actuators 6 of the motor vehicle embodied as brakes and the second control unit 4 is connected in a signal-transmitting manner with a second actuator 8 of the motor vehicle embodied as a steering system.

In other applications, there could be another number of actuators with regard to the brake function and/or the steering function. Depending on the individual case, the person skilled in the art will select and specify the appropriate selection and number of actuators for the respective function of the motor vehicle.

The respective signal transmission connection between the first control unit 2 and the brakes 6 as well as the second control unit 4 and the steering 8 is symbolized in FIG. 1 by dashed arrows 2.1 and 4.1. The brakes 6 and the steering 8 of the motor vehicle are safety-relevant and thus very important functions of the motor vehicle. This applies to a greater extent to the chosen exemplary embodiment, which is an autonomous motor vehicle.

So that even in case of failure of one of the control units 2 and 4, the brake function and the steering function of the motor vehicle can be properly and thus safely executed, the control system for the motor vehicle has a backup control unit 10 in addition to the two control units 2 and 4. The backup control unit 10 is on the one hand in a signal transmission connection with the first and the second control unit 2 and 4, which is symbolized in FIG. 1 by the solid double arrows 10.1 and 10.2. At the same time, the backup control unit 10 is also in signal transmission connection with the brakes 6 and the steering 8. This is symbolized by the dashed arrows 10.3 and 10.4.

In the following, the method according to the invention will be explained in more detail with reference to the FIGURE.

In the normal operation of the inventive control system for the autonomous motor vehicle, the brakes 6 are controlled by means of the first control unit 2 for the brake function of the motor vehicle, and the steering 8 is controlled by means of the second control unit 4 for the steering function of the motor vehicle. The need for a brake intervention by the first control unit 2 or a steering intervention by the second control unit 4 is decided in the first control unit 2 or in the second control unit 4 or in a control unit which is superordinate to the respective control unit 2, 4 in the manner known to those skilled in the art using input signals of sensors of the motor vehicle. Both an optional higher-level control unit as well as the sensors of the motor vehicle are not shown in the FIGURE.

In the above-described normal operation of the inventive control system according to the present exemplary embodiment, the backup control unit 10 does not interfere with the brake function nor the steering function of the motor vehicle. By means of the signal-transmitting connection 10.1 and 10.2 existing between the first control unit 2 and the backup control unit 10 as well as between the latter and the second control unit 4, the backup control unit 10 monitors the proper functioning of the first control unit 2 and the second control unit 4. In the event of failure of one of the two control units 2 and 4, a corresponding error signal from the faulty control unit 2 or 4 is present as an input signal at the backup control unit 10.

For example, if the first control unit 2 is malfunctioning so that the brakes 6 controlled thereby are no longer being properly monitored and thus the brake function of the motor vehicle is no longer safely executed, this error is reported to the backup control unit 10 via the signal-transmitting connection 10.1, whereupon the backup control unit 10 is configured to control the brake function of the motor vehicle, i.e., to control the function of the motor vehicle corresponding to the faulty first control unit 2. For this purpose, the backup control unit 10 is in signal exchange with the brakes 6 of the motor vehicle by means of the signal transmission connection 10.3. In the event of failure of the first control unit 2, the brakes 6 are thus no longer controlled by the first control unit 2, but rather by the backup control unit 10.

The same applies if the second control unit 4 is malfunctioning. In this case, the backup control unit 10 receives a respective error message in regard to the second control unit 4 by means of the signal-transmitting connection, after which the backup control unit 10 is configured such that it controls the steering function of the motor vehicle. The steering 8 is thus no longer controlled by the defective second control unit 4, but instead by the backup control unit 10, by means of the signal transmission connection 10.4.

The invention is not limited to the present exemplary embodiment. For example, it is conceivable that the inventive control system for a motor vehicle is present in a motor vehicle and is deactivated and can be activated for future use by means of user intervention of a vehicle operator, maintenance team or the like. The same applies to the method according to the invention for controlling a motor vehicle.

For example, it may be possible that autonomous motor vehicles are not yet legally approved in some states. In a later change in the legal situation, the motor vehicle prepared according to the invention can then be easily switched to an autonomous driving mode and thus to the use of a control system according to the invention and to the use of a method according to the invention for controlling the motor vehicle in its activation state.

In addition, it would be possible that in contrast to the exemplary embodiment in the normal operation of the inventive control system, the backup control unit is simultaneously designed as a third control unit for controlling a third function of the motor vehicle, and in response to the input of the error signal, in addition to or instead of the third function of the motor vehicle, controls the first or second function of the motor vehicle corresponding to the faulty first or second control unit by means of the backup control unit.

For example, it would be conceivable that in the normal operation of the motor vehicle, the backup control unit as the third control unit controls a rather subordinate function of the motor vehicle. Should the first or the second control unit fail, the backup control unit could be configured in such a way that in the event of failure, the latter would control a higher-ranking function, namely a function of the motor vehicle controlled by the first or the second control unit, instead of the subordinate function. As in the exemplary embodiment, this could be the brake function or the steering function of the motor vehicle. However, in other embodiments of the invention, for example, in equal-ranking functions of the motor vehicle, it would also be conceivable that the backup control unit controls the function corresponding to the faulty control unit in addition to the function corresponding to the backup control unit in its normal operation.

The invention is not limited to the brake function and steering function of a motor vehicle. The invention can also apply to other functions of a motor vehicle.

The invention being thus described, it will be obvious that the same may be varied in many ways. Such variations are not to be regarded as a departure from the spirit and scope of the invention, and all such modifications as would be obvious to one skilled in the art are to be included within the scope of the following claims:

What is claimed is:

1. A control system for a motor vehicle, the control system comprising:
a first controller configured to control one first function of a motor vehicle;
a second controller configured to control a second function of the motor vehicle;
a backup controller; and
a user interface,
wherein the first and the second controller are each connected in a signal-transmitting manner with at least one sensor and/or at least one actuator,
wherein at least the first or the second controller is connected in a signal-transmitting manner with the backup controller,
wherein the backup controller is connected to the first and the second controller in a signal-transmitting manner and is configurable in response to an input of an error signal from the first or the second controller, identifying the first controller or the second controller as a faulty controller, such that the backup controller is configured to control a function of the motor vehicle corresponding to the faulty controller,
wherein the backup controller is connectable in a signal-transmitting manner with the at least one sensor and/or at least one actuator corresponding to the faulty controller,
wherein the user interface is configured to allow a user to set the control system in a deactivation state and an activation state, and
wherein in the deactivation state of the control system, the backup controller does not control the function of the motor vehicle corresponding to the faulty controller irrespective of the input of the error signal, and in the activation state of the control system, said backup controller controls the function of the motor vehicle corresponding to the faulty controller in response to the input of the error signal.

2. The control system according to claim 1, wherein the first function of the motor vehicle is a brake function and a second function of the motor vehicle is a steering function.

3. A motor vehicle comprising a control system according to claim 1, wherein the first and the second controller are each connected in a signal-transmitting manner to at least one sensor and/or at least one actuator and at least the first or the second controller is connected with the backup controller.

4. A non-transitory computer-readable medium on which a computer program is stored, the computer program comprising commands that trigger the control system according to claim 1 to perform.

5. A motor vehicle comprising a control system according to claim 1, wherein the control system includes not more than one backup controller.

6. A motor vehicle comprising a control system according to claim 1, wherein the backup controller is reserved only to monitor functioning of the first controller and the second controller and for an event of failure of anyone of the first controller and the second controller.

7. The control system according to claim 1, wherein the control system includes not more than one backup controller.

8. The control system according to claim 1, wherein the backup controller is reserved only to monitor and control functioning of the first controller and the second controller and for an event of failure of anyone of the first controller and the second controller.

9. The control system according to claim 1, wherein the backup controller is directly connected to the first controller and the second controller.

10. The control system according to claim 1, where the backup controller is a third controller configured to control a third function of the motor vehicle and, in response to the input of the error signal, is configured to control the function of the motor vehicle corresponding to the faulty controller.

11. The control system according to claim 1, wherein the first function is a steering of the motor vehicle, and
wherein the second function is a braking of the motor vehicle.

12. The control system according to claim 1, wherein the backup controller is in signal transmission with the first controller and the second controller, and simultaneously in signal transmission with steering and braking of the motor vehicle.

13. A method for controlling a motor vehicle, the method comprising:
providing the motor vehicle with a first controller configured to control a first function of the motor vehicle, a second controller configured to control a second function of the motor vehicle, and a backup controller;
connecting, the first and the second controller, in a signal-transmitting manner with at least one sensor and/or at least one actuator;
connecting at least the first or the second controller to the backup controller in a signal-transmitting manner;
connecting the backup controller in a signal-transmitting manner with the first and the second controller; and
controlling via the backup controller, in response to an input of an error signal from the first or the second controller, identifying the first controller or the second controller as a faulty controller, the function of the motor vehicle corresponding to the faulty control unit, wherein the backup controller is connected in a signal-transmitting manner to the at least one sensor and / or at least one actuator corresponding to the faulty controller,
wherein the control system has a user interface and in response to a presence of an activation signal at the user interface, the control system can be set by a user to a deactivation state and an activation state, and
wherein in the deactivation state of the control system, the backup controller does not control the function of the motor vehicle corresponding to the faulty controller and in the activation state of the control system, the backup controller controls the function of the motor vehicle corresponding to the faulty controller in response to an incoming error signal.

14. The method according to claim 13, wherein the first function of the motor vehicle is a brake function and the second function of the motor vehicle is a steering function.

* * * * *